(12) United States Patent
Newbill

(10) Patent No.: US 7,021,685 B2
(45) Date of Patent: Apr. 4, 2006

(54) AUTOMOTIVE BUMPER CONSTRUCTION

(76) Inventor: Anthony J. Newbill, P.O. Box 21360, Wickenburg, AZ (US) 85358

( * ) Notice: Subject to any disclaimer, the term of this patent is extended or adjusted under 35 U.S.C. 154(b) by 0 days.

(21) Appl. No.: 10/891,387

(22) Filed: Jul. 12, 2004

(65) Prior Publication Data

US 2006/0006681 A1    Jan. 12, 2006

(51) Int. Cl.
  *B60R 19/48*  (2006.01)
  *B62E 43/02*  (2006.01)
(52) U.S. Cl. ............ 293/117; 293/120; 296/37.2; 224/42.12
(58) Field of Classification Search ........ 293/117, 293/120; 296/37.2; 224/42.12
  See application file for complete search history.

(56) References Cited

U.S. PATENT DOCUMENTS

| | | | |
|---|---|---|---|
| 3,822,814 A * | 7/1974 | Baldi ................... 224/502 |
| 3,884,516 A * | 5/1975 | Gallion et al. ............ 293/120 |
| 4,061,385 A * | 12/1977 | Schwartzberg ............ 293/107 |
| 4,239,253 A * | 12/1980 | Golze ..................... 280/460.1 |
| 4,266,817 A * | 5/1981 | Mason et al. ............... 293/117 |
| 4,610,458 A * | 9/1986 | Garnham ................ 280/495 |
| 4,671,550 A * | 6/1987 | Molnar ................... 293/120 |
| 4,679,717 A * | 7/1987 | Hansen ................... 224/509 |
| 4,834,273 A * | 5/1989 | Cimino ................. 224/42.21 |
| 4,950,010 A * | 8/1990 | Denny ................... 293/117 |
| 5,186,371 A | 2/1993 | Jozefczak et al. |
| 5,688,006 A * | 11/1997 | Bladow et al. ............ 293/120 |
| 6,189,748 B1 * | 2/2001 | Hutter et al. ............ 224/42.21 |
| 6,357,778 B1 * | 3/2002 | Ross ..................... 280/456.1 |
| D473,835 S | 4/2003 | Roehmer et al. |
| 6,659,318 B1 | 12/2003 | Newbill |
| 6,709,036 B1 * | 3/2004 | Evans ................... 293/120 |
| 6,827,377 B1 * | 12/2004 | Ferrigan ................. 293/117 |
| 6,840,554 B1 * | 1/2005 | Ferrigan ................. 293/117 |
| 2003/0024958 A1 | 2/2003 | Slovick |

* cited by examiner

*Primary Examiner*—Patricia Engle
*Assistant Examiner*—Greg Blankenship

(57) ABSTRACT

Extensions extend rearwardly from the frame rails of an automotive vehicle and terminate in securement to a cross member. A rear bumper has a channel portion in which the cross member is received. An end segment of the cross member serves to carry a support for a spare tire carrier. The support projects upwardly through an aperture in the bumper.

1 Claim, 2 Drawing Sheets

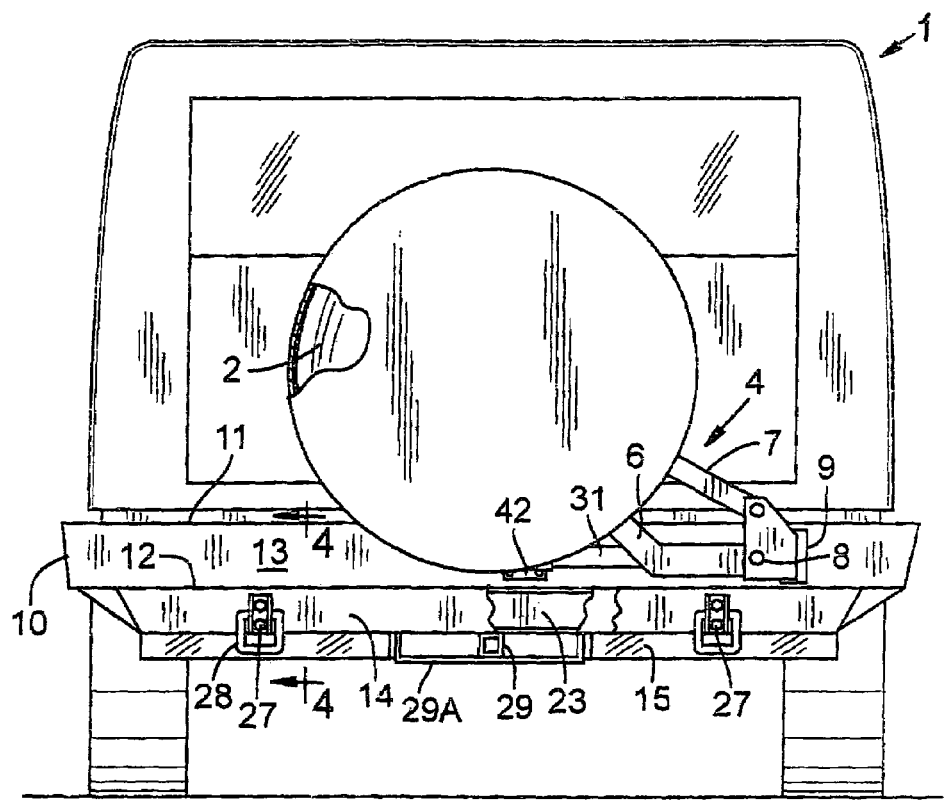
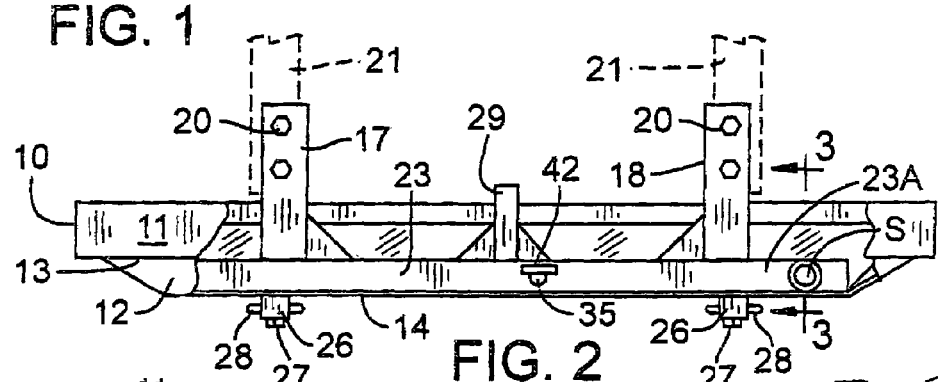
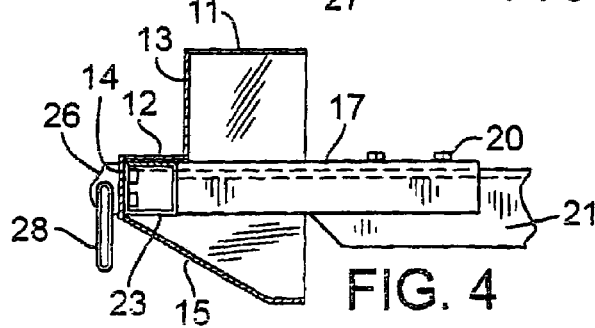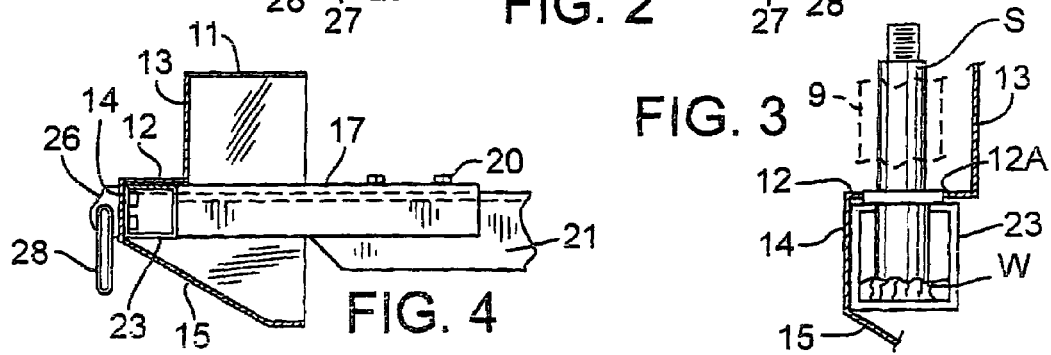

AUTOMOTIVE BUMPER CONSTRUCTION

BACKGROUND OF THE INVENTION

The present invention concerns construction of a rear bumper assembly for a sports utility vehicle.

As many sports utility vehicles, termed SUVs, are quite large, some exceeding 6,000 pounds, they require wheel assemblies of considerable size and weight. To avoid a reduction in the internal space of such a vehicle, it has been found that it is preferable to store a spare wheel assembly rearward of the vehicle cab. It has also been determined that such a wheel assembly may be carried by a tire carrier having pivot means on the vehicle rear bumper offset to one side of the longitude axis of the vehicle. Accordingly, an SUV rear bumper provided with a spare wheel carrier must be sturdy enough to withstand substantial loads, particularly when the vehicle is under way. The bumper attachment point of a spare wheel carrier must be located so as to avoid being in the path of the vehicle tailgate.

Art of interest includes U.S. Pat. No. 6,659,318 issued to the present inventor and incorporated herein by reference.

U.S. Des. Pat. No. D473,835;

U.S. Patent Application Publication U.S. 2003/0024958; and

U.S. Pat. No. 5,186,371.

SUMMARY OF THE PRESENT INVENTION

The present invention is directed toward a bumper assembly capable of withstanding loads imparted by a vehicle spare wheel assembly.

A bumper is configured to receive a cross member of the present bumper assembly, the cross member supported adjacent its ends by extensions secured to the vehicle frame rails. An attachment point for a spare tire carrier on the bumper assembly is offset from one of the frame rail extensions in an outboard direction. The attachment point so located avoids interference with travel of a vehicle tailgate. The cross member serves to support the bumper which is shaped with a channel portion to overlie cross member. D-ring mounts contribute to securing the bumper in place on the cross member. A receiver type hitch is supported by the cross member.

Important objectives of the present bumper construction include the provision of a support for a spare tire carrier by providing a cross member capable of supporting substantial loads at a point outboard of a vehicle frame rail extension; the provision of bumper construction permitting a tire carrier assembly to be carried directly by a frame supported cross member to prevent loads being imparted directly to the bumper component of the construction; the provision of bumper construction wherein the bumper per se is configured to provide a channel portion for reception of a frame supported cross member.

BRIEF DESCRIPTION OF THE DRAWINGS

In the accompanying drawings:

FIG. 1 is a rear elevational view of an SUV with the present bumper construction in place thereon;

FIG. 2 is a plan view of bumper construction removed from the SUV with fragments broken away;

FIG. 3 is a vertical sectional view taken along line 3—3 of FIG. 2;

FIG. 4 is a sectional view taken along line 4—4 of FIG. 1;

DETAILED DESCRIPTION OF THE PREFERRED EMBODIMENTS

Figure 5:
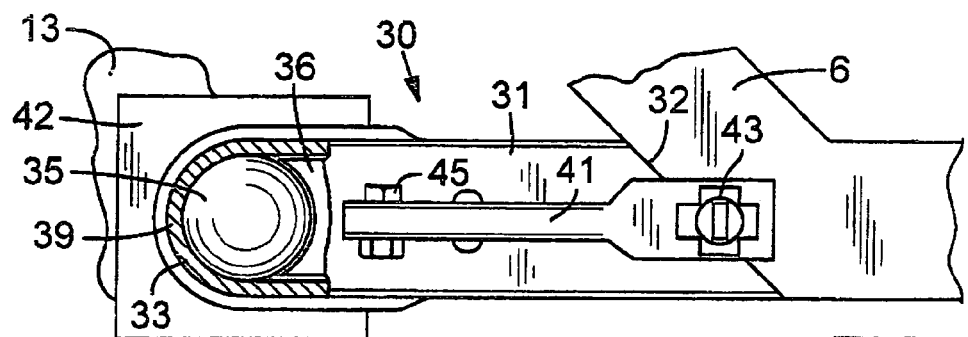
FIG. 5 is an elevational view of a latch assembly for a spare tire carrier supported by present bumper construction.

With continuing attention to the drawings wherein applied reference numerals indicate parts similarly hereinafter identified, the reference numeral 1 indicates generally the rear end of a sports utility vehicle, sometimes referred to by the acronym SUV, and characteristically larger and heavier than conventional sedans with provision for higher road clearance and a four-wheel drive capability in most cases. A spare tire and wheel at 2 is shown within a cover 3. A spare tire or wheel carrier is indicated generally at 4. U.S. Pat. No. 6,659,318 issued to the present inventor disclosing a tire carrier is incorporated herein by reference and discloses a carrier suitable for use with the present bumper construction. A latch for the spare tire carrier includes a housing 31 and is the subject of U.S. patent application Ser. No. 10/784,654 filed Feb. 23, 2004. Details of the latch are discussed later but form no part of the present invention. A spare tire support arm is at 6 while a control member 7 pivots the arm about a pivot 8. A bearing is at 9.

With attention to the present bumper construction, the bumper proper is indicated at 10, formed of heavy gauge steel, with an uppermost horizontal surface 11 extending lengthwise of the bumper. A second horizontal surface at 12 is integral with uppermost surface 11 by a web or wall at 13. A rear wall 14 of the bumper extends in a vertical manner downwardly and thence forwardly, relative the vehicle, at 15. Contiguous bumper surfaces 12, 14 and 15 form a channel portion for reception of a cross member, later described.

With reference to FIG. 2, structure is disclosed for supporting bumper 10 at the rear end of vehicle 1 with the structure including rail extensions at 17 and 18 of the vehicle frame rails 21. Suitable extension members are formed from channel shaped steel beam sections. The extensions may be in welded securement with the vehicle frame rails or secured by fasteners 20. Rail extensions 17 and 18 terminate rearwardly, with respect to the vehicle, for securement to a bumper supporting cross member 23 extending transversely of the vehicle center line. A cross member distal end segment 23A provides a support S secured as by a weld W, for spare tire carrier bearing 9. Bumper surface 12, as shown in FIG. 3, is apertured at 12A for passage of support S therethrough during installation of the bumper on cross member 23. D-ring mounts are indicated at 26 and include fasteners 27 for securement of D-rings at 28 to cross member 23 with bumper wall 14 apertured to admit threaded studs 27. Bumper surfaces 12 and 14 are supported by contiguous walls of cross member 23 shown being of rectangular cross section.

A receiver at 29 constitutes part of a trailer hitch carried by cross member 23 with the receiver being additionally supported by a bracket 29A welded at its ends to the underside of cross member 23.

Figure 6:
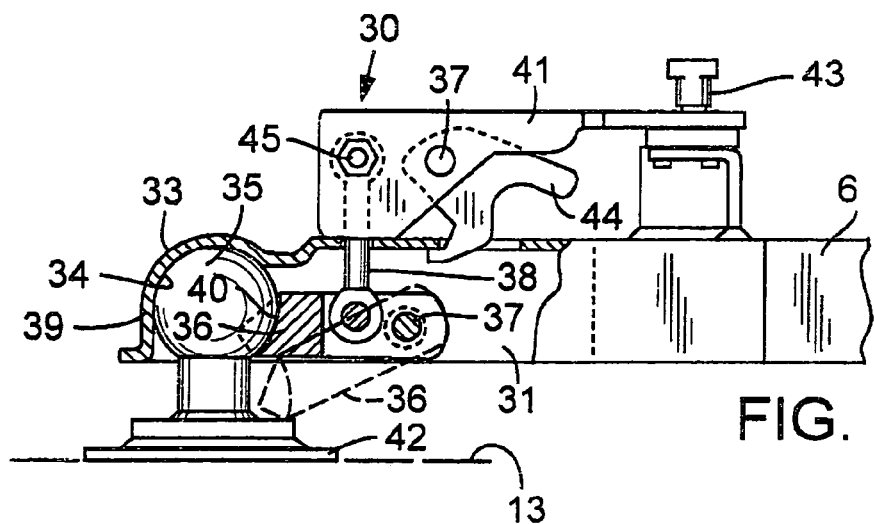
FIG. 6 is a bottom plan view of FIG. 5.

In FIGS. 5 and 6 a combination latch and support structure is shown for the support arm 6 shown in FIG. 1. The aforementioned latch and support structure forms no part of the present invention and is the subject of a U.S. patent application Ser. No. 10/784,654 filed by the present inventor and incorporated herein by reference.

A latch assembly is indicated generally at 30 in FIGS. 5 and 6 and serves to retain arm 6 in position rearward and transversely of the vehicle body during vehicle travel. The latch 30 includes a housing 31 of elongate shape terminating in securement at one end 32 to arm 6 as by welding. The elongate housing terminates oppositely and in a partially hemispherical end 33 with a concave inner surface 34 for abutment with a ball component 35. Ball 35 is affixed to a plate 42 secured to bumper wall 13. With attention to FIG. 6, it will be noted that the outer end of housing 31 moves into engagement with ball member 35 with the former seating without axial displacement of housing 31 as best viewed in FIG. 6. A curved wall segment 39 of housing end 33 is formed about a single axis permitting ball and housing engagement without axial displacement of the housing. A lock at 36 moves about a pin 37 extending through the housing in response to movement of a rod 38 displaced upon rotational lifting and lowering a handle 41 about pivot pin 45. Lock 36 has a spherical wall surface 40 which abuts ball member 35 when lock 36 is in the raised, operative position shown to prevent horizontal movement of housing 31 away from the ball member. Upon release of a safety latch at 44 and subsequent raising of handle 41, rod 38 shifts to displace lock 36 to the broken line position in FIG. 6 permitting separation of housing 31 from the ball member. The abutment of the curved interior 34 of housing end 33 prevents vertical displacement of housing 31 and arm 6 during vehicle travel in response to vertical loads imparted to arm 6 by spare tire carrier 4. Fore and aft loads are countered by lock 36 and the partially hemispherical end 33 of the housing. Latch 30 includes features in common with an automotive trailer hitch.

While I have shown but one embodiment of the invention, it will be apparent to those skilled in the art that the invention may be embodied still otherwise without departing from the spirit and scope of the claimed invention.

Having thus described the invention, what is desired to be secured by a Letters Patent is:

1. Vehicle bumper construction supporting a spare tire carrier and including
    frame extensions each for securement to a vehicle frame,
    a cross member carried by said frame extensions,
    a bumper defining a horizontal channel portion overlying said cross member,
    a support on said cross member extending through an opening in said bumper and supporting the spare tire carrier,
    fastening means securing said bumper to said cross member, and
    a latch assembly jointly carried by said bumper and the spare tire carrier.

* * * * *